Figure 1:
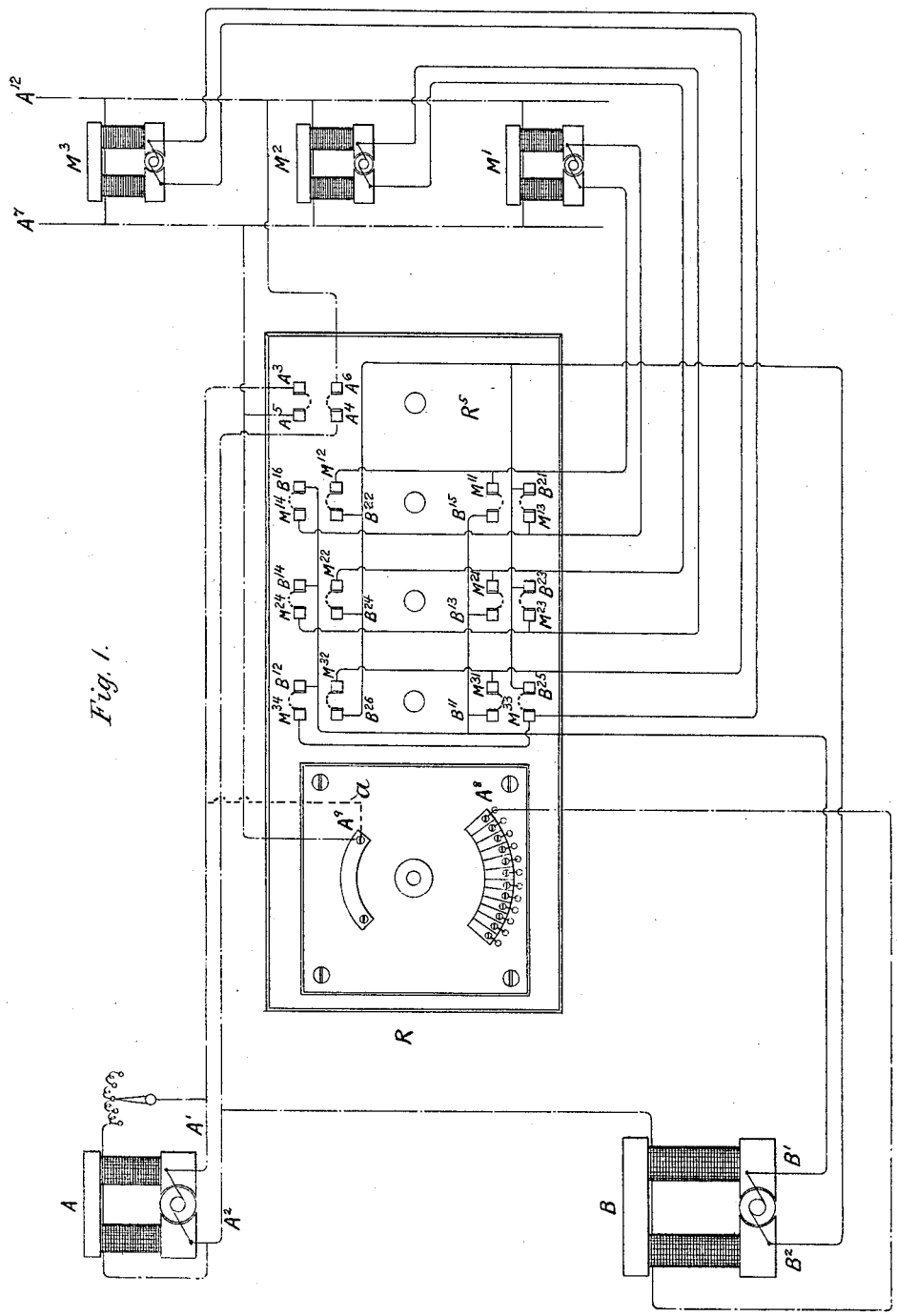

(No Model.) 3 Sheets—Sheet 1.
J. S. BANCROFT.
METHOD OF OPERATING ELECTRIC MOTORS.

No. 519,686. Patented May 8, 1894.

WITNESSES:

INVENTOR
J. Sellers Bancroft (No Model.) 3 Sheets—Sheet 2.
J. S. BANCROFT.
METHOD OF OPERATING ELECTRIC MOTORS.
No. 519,686. Patented May 8, 1894.
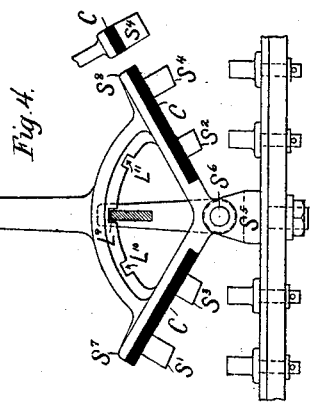
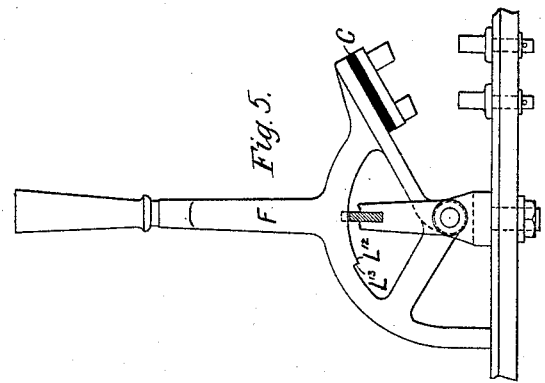
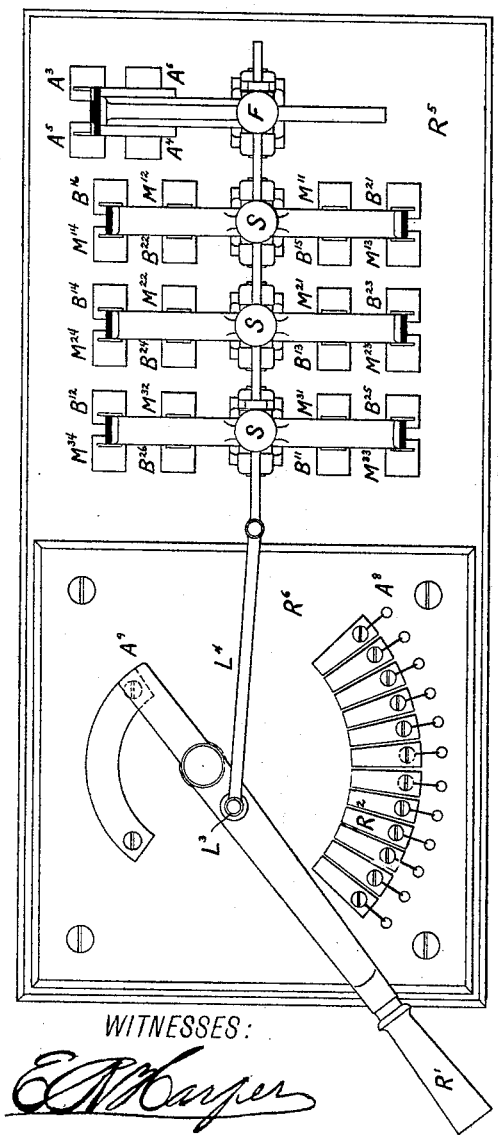
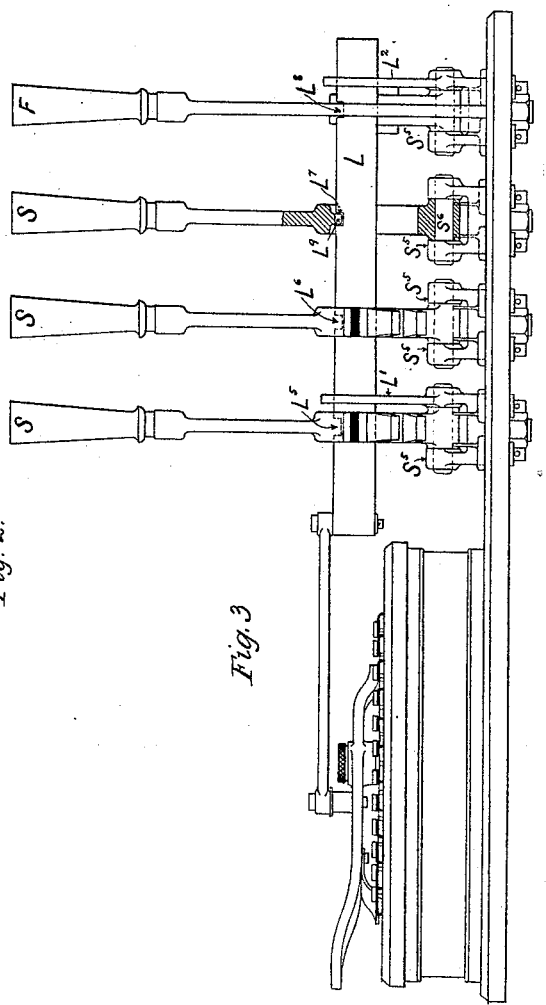
WITNESSES:
INVENTOR

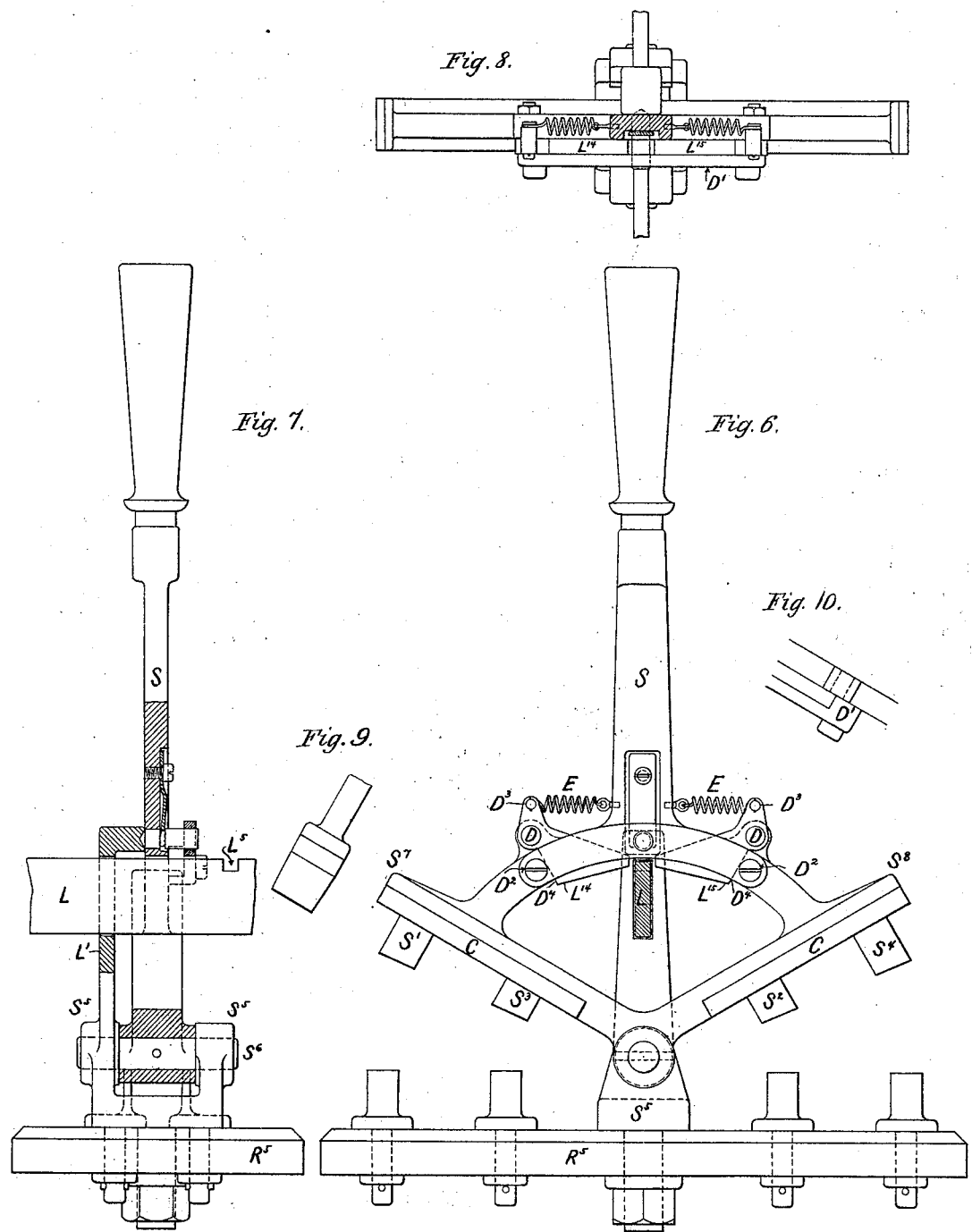

UNITED STATES PATENT OFFICE.

JOHN SELLERS BANCROFT, OF PHILADELPHIA, PENNSYLVANIA, ASSIGNOR TO THE WILLIAM SELLERS & COMPANY, INCORPORATED, OF SAME PLACE.

METHOD OF OPERATING ELECTRIC MOTORS.

SPECIFICATION forming part of Letters Patent No. 519,686, dated May 8, 1894.

Application filed December 15, 1892. Serial No. 455,325. (No model.)

*To all whom it may concern:*

Be it known that I, JOHN SELLERS BANCROFT, of the city and county of Philadelphia and State of Pennsylvania, have invented certain new and useful Improvements in Methods of Operating Electric Motors, of which the following is a specification.

In starting electric motors of the shunt type, it is customary to use a switch in connection with a rheostat, whereby the current from the source of supply is admitted to the fields directly, and to the armature through the full resistance of the rheostat; so soon as the armature begins to revolve, the resistance of the rheostat is gradually cut out until the armature is put in full communication with the source of supply and is revolving at its proper speed. It is, however, known that if the shunt circuit of a motor to be supplied with current from a source of constant potential, and the armature from a current, the potential of which may be varied, the starting rheostat for the motor may be dispensed with and we obtain a motor that is as well adapted as the series form, to start under a load, and possesses besides, the great advantage of wasting none of its armature current through a rheostat in starting, and of having its speed entirely controllable, with the consumption of power almost directly proportioned to the useful work done.

My present invention relates to a method of operating any or all of a group of motors the armatures of which receive their current from a common source of supply.

The objects of my invention are to diminish the cost of installation, to protect the motors from injury from careless handling, and to facilitate the operation, where several motors are to be operated from one point by one operator, and to these ends my invention consists in providing each motor with a switch that connects its armature circuit with the armature of the generator, in combining with these switches a rheostat by means of which the generator field can be modified and the current in the armature of the generator and therefore in the armatures of all the motors that may be connected with it, can be controlled or cut off, and connecting the switches of each motor with the operating lever of the rheostat by an interlocking device so arranged that the motor switches can be operated to connect them, only when the rheostat is in position to cut off all current.

It further consists in interlocking with the motor switches, the rheostat lever so that it can be operated only when the motor switches are individually in the extreme position for forward, or backward motion, or in the central position which admits no current to the motor armature.

It further consists in providing a switch which admits current to the field of the motor, and in interlocking this switch with the rheostat lever so that the field switch can be moved only when the rheostat is in position to cut off all current and so that the rheostat can be moved only when the field switch is in position to admit current.

In the accompanying drawings, which form part of this specification, Figure 1, Sheet 1, shows the arrangement of connections and switches for a group of these motors to be operated by my present invention. Fig. 2, Sheet 2, is a plan of the rheostat lever and switches; Fig. 3, an elevation of the same, showing one of the levers partly in section. Fig. 4 is a side elevation of one of the armature switches shown in Fig. 3. Fig. 5 is a side elevation of the field switch. Fig. 6, Sheet 3, is an enlarged elevation of an armature switch with spring latches. Fig. 7 is a side elevation of Fig. 6 showing a section through the center of the lever. Fig. 8 is a plan of Fig. 6 with the lever cut away to show the latches. Fig. 9 is an end view of one of the arms of the lever in Fig. 6. Fig. 10 is a view of one end of the yoke around the latches.

A, Fig. 1, represents a generator furnishing a current of constant potential for exciting the field of the generator B and the fields of the motors M', M², M³, &c.

B, is a larger generator of the shunt type or compound type, but without any connection between the field shunt coils and the armature coils, the term shunt applying to the character of the winding and not to the method of connection, for the shunt coils are supplied with current, not from the generator B, but from the generator A through the rheostat R, by which the current flowing to the field magnets is regulated so as to vary the intensity of the field; as the field is weakened the voltage of the current produced by the armature is reduced.

$M'$ $M^2$ $M^3$ represent a series of motors, three are shown, but any desired number may be used. The fields of these motors are supplied with current from the generator A, the broken lines indicating the wiring from this generator, their armature circuits are supplied from the generator B through the switch connections on the base plate $R^5$. In Fig. 1, the rheostat lever, locking bar, and switch levers are removed in order to show the connection clearly. The broken line $A'$ represents the line wire that runs from a brush of the generator A to the block $A^3$ on the base plate $R^5$.

$A^2$ is the other wire that runs to the block $A^4$ on the base plate $R^5$ and also by a branch through the field coils of the generator B to the last step of the generator rheostat at $A^8$.

$A^7$ and $A^{12}$ are the mains that supply the field coils of the motors $M'$ $M^2$ $M^3$ and are connected to the blocks $A^5$ and $A^6$ respectively, the gaps between the blocks $A^3$ and $A^5$ and between $A^4$ and $A^6$ prevent any current flowing to the motor fields until these gaps are filled by corresponding blocks on the field switch. When they are filled by these blocks, current will flow through the motor fields energizing them and connection will also be made with the generator rheostat at $A^9$. The generator rheostat may if preferred have a connection directly from $A^9$ to the line $A'$ without going through the blocks $A^3$ $A^5$ and the field switch, as the interlocking devices will prevent a circuit being made through the rheostat until after the field switch is closed, as indicated by dotted line marked $a$ in Fig. 1. By moving the operating lever of the rheostat, current may be made to flow through the field coils of the generator B, at first through the full resistance of the rheostat, which may be adjusted so that this full resistance will admit only sufficient current to excite the field to that degree that will just produce current in the armature of sufficient voltage to rotate the motor armatures; as the rheostat lever is moved to cut out the resistance the volume of current flowing to the generator field is increased, the voltage of its armature current rises and attains its maximum when the resistance of the rheostat is entirely cut out.

The full lines $B'$ and $B^2$ represent the mains from the armature of the generator B, these mains are led to the base plate $R^5$ and are there branched and connected to the switch blocks as shown, $B'$ being connected to the blocks $B^{11}$ $B^{13}$ $B^{15}$ $B^{12}$ $B^{14}$ $B^{16}$.

$B^2$ is connected to the blocks $B^{21}$ $B^{23}$ $B^{25}$ $B^{22}$ $B^{24}$ $B^{26}$. The wires from the brushes of the armatures of each motor are led to the same base plate and are coupled to the switch blocks in proper relation to the blocks connected to the mains from the generator B. Motor $M'$ is coupled to the switch blocks $M^{11}$ $M^{12}$ $M^{13}$ and $M^{14}$. Motor $M^2$ to the blocks $M^{21}$ $M^{22}$ $M^{23}$ and $M^{24}$. Motor $M^3$ to the blocks $M^{31}$ $M^{32}$ $M^{33}$ and $M^{34}$. Any motor may be coupled to the mains $B'$, $B^2$ by connecting one set of the motor switch blocks with the corresponding blocks on the mains by inserting a connecting block between them. If we connect $B^{22}$ with $M^{12}$ and $B^{16}$ with $M^{14}$, the motor $M'$ will be coupled to the generator B and will run in one direction as soon as the armature of the generator produces current; if we break this connection and connect $B^{21}$ with $M^{13}$ and $M^{11}$ with $B^{15}$ the motor $M'$ will again be coupled to the generator B but will run in the opposite direction. Any or all of the motors may be coupled in this way, coupling the even numbered blocks producing rotation in one direction, and coupling the odd numbered blocks producing rotation in the opposite direction. The means for coupling these various movements in order to secure proper sequence of the operations is shown on Sheets 2 and 3.

S, represents a switch lever pivoted by the pin $S^6$ to the stands $S^5$ secured to the base plate $R^5$. The lever S is provided with arms $S^7$ $S^8$ to the under side of which are secured the connecting switch blocks $S'$, $S^3$, $S^2$, $S^4$ suitably insulated from each other and from the switch arms by the non-conducting pieces C, C. The switch blocks are made to fill the spaces between the switch blocks secured to the base plate $R^5$. The device thus forms a double pole switch which makes or breaks the connection from the motor armature to the generator mains, one arm of the switch, coupling so as to produce forward rotation and the other arm producing when coupled, backward rotation. The dotted curved lines joining the blocks $M^{34}$ and $B^{12}$, $B^{26}$ and $M^{32}$, &c., in Fig. 1, indicate the circuits when the switches are closed.

$R'$ Fig. 2, represents the lever for operating the rheostat switch for the generator field, this lever is pivoted at $R^3$ to the base plate $R^5$.

$R^2$ represents the successive blocks through contact with which the resistance is varied; when the lever $R'$ is in its extreme position to the left as shown, contact is broken and no current flows. L represents a locking bar supported in bearings $L'$ $L^2$ raised from the bearings $S^5$. This bar is coupled to the lever $R'$ at $L^3$ by the connecting rod $L^4$; this locking bar is provided with notches $L^5$ $L^6$ $L^7$ $L^8$ as shown in Fig. 3, and each lever is provided with an internal rib $L^9$ notched or cut away to allow the bar L to slide through when the levers are in the central or out of gear position as shown in Figs. 3 and 4 and also notched at $L^{10}$ and $L^{11}$ as indicated in Fig. 4 to allow the locking bar to slide through when a switch lever is in its closed position for either forward or backward motion. These notches $L^5$ $L^6$, &c., coincide with the ribs $L^9$ only when the lever $R'$ is in the position shown with the bar L drawn to its extreme position to the left, while in this position, any one or all of the levers S S can be thrown from or toward the operator, coupling the motor armature with the generator for either forward or backward motion, and bringing the side notches $L^{10}$ or $L^{11}$ of the levers so moved into line with the bar L so as not to interfere with its motion. By the first motion of the locking bar the notches $L^5$ $L^6$ $L^7$ are moved out of line with the locking ribs $L^9$ and hence the switch levers are securely locked in or out of gear as the case may be, until the bar L is again returned to its extreme position to the left. The lever F which closes the connection for the field circuit is shown open and it will be noticed, see Fig. 5, that the locking rib $L^{12}$ is provided with but one notch at $L^{13}$ which allows the bar L to move only when the switch lever F is closed to admit current to the fields and to the rheostat, the lever R' may then be moved to the right to admit current to the generator field, but as soon as the lever R' has been moved so as to make contact with the first block of the series $R^2$ the notch $L^8$ will have passed out of line with the locking rib $L^{12}$ and the field lever L is thereby locked in gear until the lever R' is again moved to its extreme position to the left and when the lever F is opened its locking rib $L^{12}$ engages in the notch $L^8$ of the bar L and prevents any movement of the rheostat lever R' and hence makes it impossible to admit any current to the motor armatures until after current has been admitted to the fields.

When several motors are running at once, it is often desirable to stop one without interfering with the running of the others; for such cases, I dispense with the locking rib and provide in its stead the interlocking latches $L^{14}$ $L^{15}$ shown in Fig. 6 pivoted to the lever S at the points D D; the latches rest against the ends of the yoke strap D' Fig. 10, which is secured to the lever S by the screws $D^2$ $D^2$ the latches $L^{14}$ $L^{15}$ are prolonged above the pivots D D to the points $D^3$ $D^3$ where spiral springs are attached to draw these ends in toward the lever S and so hold the latches down in place. The lever is shown in the central position, the locking bar being between the latches which will then prevent motion of the lever S in either direction until a notch in the locking bar is brought into the plane of the latches when the lever may be moved in either direction as before, if, when the lever is in its extreme position and the locking bar has been moved so that the notch no longer coincides with the latches, it is desired to break the connection, the movement of the lever will be resisted by the heel of the latch at $D^4$ coming against the locking bar. This pressure reacts against the spring which yields and allows the latch to rise, sufficiently to ride over the bar L until the lever reaches its central position when the latch springs back to place and holds the lever as before.

I do not limit myself to the special forms of switches and locking bar shown and described, as many forms of switches may be used and coupled with the rheostat, to produce the same results; but

What I claim as new, and desire to secure by Letters Patent, is—

1. Two or more motors, a source of current for the motor fields, a reversing switch for the armature circuit of each motor, a rheostat that controls the potential of the armature current and means for interlocking the actuating parts of the reversing switches with the actuating part of the rheostat.

2. A motor, a switch to admit current to its field, a switch to admit current to its armature, a rheostat that modifies the voltage of the armature current and means for interlocking the operating parts of the switches and of the rheostat and determining the sequence of operation.

3. A motor, a source of current for the motor field, a switch that admits current to the motor field, a rheostat that controls the source of current to the motor armature, a reversing switch that connects, cuts off or reverses the current from the source of current to the motor armature and an interlocking bar coacting with the levers of the rheostat and the two switches.

4. A generator supplying current of constant potential, a generator with its field excited by a current distinct from its armature current, a rheostat for varying the current supplied to this field, a motor the field of which is supplied by the first generator and the armature by the second generator, a switch that admits current to the motor field, and a locking bar coupled to the rheostat and locked by the field switch.

J. SELLERS BANCROFT.

Witnesses:
F. M. HUTCHINSON,
E. R. HARPER.